US007423963B2

(12) United States Patent
Lee

(10) Patent No.: US 7,423,963 B2
(45) Date of Patent: Sep. 9, 2008

(54) APPARATUS AND METHOD FOR CONTROLLING PACKET DATA TRANSMISSION BETWEEN BSC AND BTS

(75) Inventor: Sung-Won Lee, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 1060 days.

(21) Appl. No.: 10/145,060

(22) Filed: May 14, 2002

(65) Prior Publication Data
US 2002/0167926 A1 Nov. 14, 2002

(30) Foreign Application Priority Data
May 14, 2001 (KR) ................................. 2001-26142

(51) Int. Cl.
H04L 12/00 (2006.01)
(52) U.S. Cl. ....................... 370/229; 370/235; 370/328; 370/338
(58) Field of Classification Search ........................ None
See application file for complete search history.

(56) References Cited
U.S. PATENT DOCUMENTS 6,405,256 B1 * 6/2002 Lin et al. ..................... 709/231
2001/0036820 A1 11/2001 Fong et al.
2001/0055972 A1 12/2001 Sakata
2003/0035373 A1 * 2/2003 Bass et al. ................. 370/230.1
2004/0193719 A1 * 9/2004 Yang et al. .................. 709/229
2005/0094667 A1 * 5/2005 Dahlman et al. ............ 370/473

FOREIGN PATENT DOCUMENTS

| CN | 1138929 | 12/1996 |
|---|---|---|
| EP | 0887948 A2 | 12/1998 |
| EP | 1001643 A2 | 5/2000 |
| JP | 05-308374 | 11/1993 |
| JP | 11-252035 | 9/1999 |

OTHER PUBLICATIONS

"Forward Link Capacity in Smart Antenna Basestations with Dynamic Slot Allocation" Sinha, et al., The Ninth IEEE International Symposium on Personal Indoor and Mobile Radio Communications PIMRC '98, Conference Proceedings vol. 2 of 3 pp. 942-946, 1998.
"Performance of a Hybrid CDMA/ISMA Protocol with Multiple Return Channels and Buffering", H.R.R. van Roosmalen, et al. Delft University of Technology, pp. 1024-1028, Sep. 1994.

(Continued)

Primary Examiner—Wing F. Chan
Assistant Examiner—Robert C Scheibel
(74) Attorney, Agent, or Firm—The Farrell Law Firm, PC

(57) ABSTRACT

Disclosed is an apparatus and method for controlling packet data transmission between a base station controller (BSC) and a base transceiver system (BTS) in a mobile communication network. The BSC transmits as much packet data as an amount that can be actually stored in a buffer of the BTS. The BTS has the buffer for temporarily storing the packet data, to be transmitted to a mobile station, received from the BSC.

14 Claims, 15 Drawing Sheets

OTHER PUBLICATIONS

"Distributed-Queueing Request Update Multiple Access (DQRUMA) for Wireless Packet (ATM) Networks", Mark J. Karol, et al., ICC '95 Seattle, Communications—Gateway to Globalization, 1995 IEEE International Conference on Communications Jun. 18-22, 1995, pp. 1224-1231.

"A New Dynamic Reservation Multiple Access Protocol for Supporting Multimedia Traffic in Third Generation Cellular System", Beraldi, et al., Singapore, ICCS '94 Conference Proceedings, vol. 1 of 3, "Towards Multimedia Personal Communications", pp. 314-319, Nov. 1994.

"Performance Models of Handover Protocols and Buffering Policies in Mobile Wireless ATM Networks", Marsan, et al, IEEE Transactions on Vehicular Technology, Jul. 2001 vol. 50 No. 4, pp. 925-941.

"A Method of Data Transfer Control During Handoffs in Mobile Multimedia Networks", Laxman, et al., 2000 IEEE, International Conference on Personal Wireless Communications, Hyderabad, India, Dec. 17-20, 2000, pp. 65-69, Dec. 2000.

"FDA: A Novel Base Station Flow Control Scheme for TCP Over Heterogeneous Networks", Hu, et al., IEEE Infocom 2001, The Conference on Computer Communications, vol. 1 of 3, 20th Annual Joint Conference of the IEEE Computer and Communications Societies, Apr. 22-26, 2001, pp. 142-151.

\* cited by examiner

| User-ID | NUM tx_SDU2BTS | NUM tx_BTS2AIR | Q BTS_Q_PER_USER |
|---|---|---|---|

FIG. 9

APPARATUS AND METHOD FOR CONTROLLING PACKET DATA TRANSMISSION BETWEEN BSC AND BTS

PRIORITY

This application claims priority to an application entitled "Apparatus and Method for Controlling Packet Data Transmission between BSC and BTS" filed in the Korean Industrial Property Office on May 14, 2001 and assigned Serial No. 2001-26142, the contents of which are hereby incorporated by reference.

BACKGROUND OF THE INVENTION

1. Field of the Invention

The present invention relates generally to packet data transmission in a mobile communication network, and in particular, to an apparatus and method for controlling packet data transmission between a base station controller (BSC) and a base transceiver system (BTS).

2. Description of the Related Art

In general, a mobile communication network, such as CDMA-2000 (Code Division Multiple Access-2000), WCDMA (Wideband CDMA, also known as UMTS (Universal Mobile Telecommunication System)), GPRS (General Packet Radio System), and CDMA-2000 1xEV-DO (Evolution Data Only) networks, includes a base station controller (BSC) and a base transceiver system (BTS). Such a mobile communication network has typically provided only a voice service to a mobile subscriber, but recently shows a tendency to support a packet data service as well as the voice service.

FIG. 1 illustrates a configuration of a general mobile communication network that provides a mobile subscriber with a packet data service as well as a voice service. Referring to FIG. 1, a mobile communication network includes mobile stations (MSs) 11 and 12, base transceiver systems (BTSs) 20 and 30 wirelessly connected to the mobile stations 11 and 12 for wireless communication with them, and a base station controller (BSC) 40 connected by wire to the base transceiver systems 20 and 30 for wire communication with them. The base station controller 40 is connected to a mobile switching center (MSC) 50 and a gateway (GW) 60. The mobile switching center 50 is connected to a public switched telephone network (PSTN), and the gateway 60 is connected to Internet/PSDN (Public Serving Data Network). Therefore, when the mobile station 11 is connected to the PSTN through the mobile switching center 50 under the control of the base station controller 40, the mobile station 11 is provided with a voice service. When the mobile station 11 is connected to the Internet/PSDN through the gateway 60, the mobile station 11 is provided with a packet data service.

The base transceiver systems 20 and 30 include RF (Radio Frequency) schedulers 21 and 31, respectively. The base station controller 40 includes an SDU/RLP (Selection & Distribution Unit/Radio Link Protocol) 41. The RF schedulers 21 and 31 are provided to help the base transceiver systems 20 and 30 efficiently utilize radio resources, and also to help the users properly share the limited radio resources. The SDU is provided to transmit traffic to a plurality of base transceiver systems, and to combine data from the same MS, received from the plurality of the base transceiver systems. Optionally, the SDU may also be included in the gateway 60 and perform the same function. However, herein, the SDU is included in the base station controller 40. The RLP is provided to convert packet data traffic received from the gateway 60 into an error control protocol frame format, and transmit it to the base transceiver systems 20 and 30. Here, it should be noted that the base transceiver systems 20 and 30 have a limited buffer size for the users. Therefore, when excessive traffic larger than allocable to the corresponding users is transmitted from the base station controller 40 to the base transceiver systems 20 and 30, a traffic loss occurs inevitably in the base transceiver systems 20 and 30. For the traffic loss during communication between the base station controller 40 and the base transceiver systems 20 and 30, a retransmission procedure is performed through an error control function (e.g., RLP error recovery function) between the mobile station (herein, mobile station 11 by way of example) and the base station controller 40. The retransmission procedure causes propagation delay and a reduction in efficiency of radio resources. In addition, the mobile station may perform a handoff while on the move between the base transceiver systems. Therefore, when provided with excessive traffic, the mobile station should occasionally discard the traffic during the handover, resulting in a reduction in efficiency of a link used between the base station controller and the base transceiver system in order to transmit the traffic.

A conventional packet data transmission control operation between the base station controller and the base transceiver system, proposed to solve the above problems, is illustrated in FIGS. 2 and 3. In the following description, it will be assumed that the packet data transmission control operation is performed between the base station controller 40 and the base transceiver system 20 of FIG. 1. The term "BSC_BUF" as used herein represents an amount (hereinafter, referred to as "buffered amount") of packet data traffic stored in an internal buffer of the base station controller 40, and the term "BTS_BUF" represents an amount (hereinafter, referred to as "buffered amount") of packet data traffic stored in an internal buffer of the base transceiver system 20. Further, the term "BTS_Q_SIZE" represents a maximum amount of available packet data traffic that can be stored in the internal buffer of the base transceiver system 20. That is, "BSC_BUF" represents a current size of the internal buffer in the base station controller 40, "BTS_BUF" represents a current size of the internal buffer in the base transceiver system 20, and "BTS_Q_SIZE" represents the maximum size of the internal buffer in the base transceiver system 20.

FIG. 2 illustrates a procedure for controlling packet data transmission by a base station controller according to the prior art. Referring to FIG. 2, the base station controller 40 waits for packet data traffic to be received from the gateway 60 or waits for a buffered amount to be reported from the base transceiver system 20 (Step S201). Upon receiving a report on the buffered amount from the base transceiver system 20, the base station controller 40 updates the reported buffered amount to the current buffer size BTS_BUF of the base transceiver system 20 (Step S209).

Upon receiving packet data traffic from the gateway 60, the base station controller 40 stores the received traffic in its internal buffer (Step S203), and increases the current buffer size BSC_BUF of the base station controller by the received traffic amount (Step S204). If the current buffer size BTS_BUF of the base transceiver system 20 is less than the maximum buffer size BTS_Q_BUF allocated to the corresponding user by the base transceiver system 20 ("Yes" in Step S205), the base station controller 40 transmits to the base transceiver system 20 as much traffic as the base transceiver system 20 can receive among the traffic stored in the internal buffer, i.e., as much traffic as can be accommodated by (BTS_Q_SIZE−BTS_BUF) (Step S206). After transmitting the traffic to the base transceiver system 20, the base station controller 40 decreases the current BSC_BUF of the base station controller by the transmitted traffic amount (Step S207).

If BTS_BUF is equal to BTS_Q_SIZE, it means that a transmissible traffic amount has reached its limit ("No" in Step S205), so the base station controller 40 waits for BTS_BUF to be decreased below BTS_Q_SIZE (Step S201). Upon receiving a report that BTS_BUF is less than BTS_Q_SIZE from the base transceiver system 20, the base station controller 40 transmits to the base transceiver system 20 as much traffic as the base transceiver system 20 can receive among the traffic stored in its internal buffer (Step S206).

FIG. 3 illustrates a procedure for transmitting a control message with current buffer size information by a base transceiver system according to the prior art. Referring to FIG. 3, the base transceiver system 20 waits a control message transmission time (Step S301). If it is the control message transmission time ("Yes" in Step S302), the base transceiver system 20 transmits the control message with BTS_BUF and BTS_Q_SIZE to the base station controller 40 (Step S303). Here, the "control message transmission time" can be set to either a preset period or a time at which traffic is transmitted to the base station controller 40. When traffic is transmitted to the base station controller 40, the BTS's current buffer size information BTS_BUF is transmitted as in-band information of the corresponding traffic.

FIG. 4 illustrates a procedure for exchanging packet data between a base station controller and a base transceiver system according to the prior art. Here, it is assumed that BTS_Q_SIZE is 64 packets and BTS_BUF is initially empty.

Referring to FIG. 4, if it is assumed that the base station controller 40 has received 64 packets from the gateway 60 (Step 40a), the base station controller 40 stores the received packets in its internal buffer, and then increases BSC_BUF to 64. At this point, since the number of packets currently stored (or piled) in the base transceiver system 20 is 0, the base station controller 40 judges that it can transmit 64 packets, and based on the judgment, transmits the 64 packets to the base transceiver system 20 (Step 40b). The 64 packets transmitted by the base station controller 40 are received at the base transceiver system 20 (Step 40c). After receiving the 64 packets, the base transceiver system 20 reports that the current buffer size BTS_BUF of the base transceiver system has increased to 64 packets by transmitting a control message at a preset control message transmission time (Step 40d). Upon receipt of the control message from the base transceiver system 20, the base station controller 40 sets the current buffer size BTS_BUF of the base transceiver system to 64 packets. At this point, since the BTS's current buffer size BTS_BUF is identical to the BTS's maximum buffer size BTS_Q_SIZE, the base station controller 40 recognizes that it cannot transmit more packets.

In this state, if 64 new packets are received, the base station controller 40 stores the 64 new packets in its internal buffer, and then updates the BSC's current buffer size BSC_BUF (Step 40e). At this point, since the BTS's current buffer size BTS_BUF is 64 packets (i.e., the BTS's maximum buffer size), the base station controller 40 waits without transmitting the 64 new packets.

Thereafter, the base transceiver system 20 transmits 32 packets to the mobile station 11 (Step 40f), and reports to the base station controller 40 that the BTS's current buffer size is 32 packets (Step 40g). The base station controller 40 then judges that an amount of the packets transmissible to the base transceiver system 20 has increased to 32 packets, and based on the judgment, transmits 32 of the new 64 packets stored in the internal buffer to the base transceiver system 20.

The packet data transmitting operation of FIG. 4 has been described for the case where the base station controller 40 and the base transceiver system 20 are in a normal state. However, there is a case where the base station controller 40 and the base transceiver system 20 are in an abnormal state. For example, the packet transmitted from the base station controller 40 may arrive at the base transceiver system 20 after much propagation delay due to link delay or buffering between the base station controller 40 and the base transceiver system 20. A packet data transmission operation between the base station controller and the base transceiver system for this case is illustrated in FIG. 5.

FIG. 5 illustrates a modified procedure for exchanging packet data between a base station controller and a base transceiver system according to the prior art. Here, it is again assumed that BTS_Q_SIZE is 64 packets and BTS_BUF is initially empty.

Referring to FIG. 5, if it is assumed that the base station controller 40 has received 64 packets from the gateway 60 (Step 50a), the base station controller 40 stores the received packets in its internal buffer, and then increases BSC_BUF to 64. At this point, since the base station controller 40 can transmit 64 (=BTS_Q SIZE[64]–BTS_BUF[0]) packets, it transmits 64 packets to the base transceiver system 20 (Step 50b).

In some cases, before the transmitted 64 packets arrive at the base transceiver system 20, or before BTS_BUF is otherwise updated in BSC, the base station controller 40 may receive 64 new packets (Step 50c). Upon receiving the new packets, the base station controller 40 calculates an available capacity of the base transceiver system 20. In this case, since the transmitted 64 packets have not yet arrived at the base transceiver system 20 and thus BTS_BUF at the BSC still shows that it is 0, the base station controller 40 misjudges that the BTS_BUF is 0. Therefore, the base station controller 40 calculates that an amount of the traffic that the base transceiver system 20 can additionally receive is 64 (=BTS_Q_SIZE[64]–BTS_BUF[0]), and then, transmits the received 64 new packets to the base transceiver system 20 (Step 50d).

Accordingly, the base transceiver system 20 receives the additional 64 packets transmitted in Step 50d in addition to the 64 packets transmitted in Step 50b. In this case, the amount of the packets received at the base transceiver system 20 exceeds the maximum size of the internal buffer of the base transceiver system 20, i.e., exceeds a limit of 64 packets. This causes overflow of the internal buffer in the base transceiver system 20, so retransmission occurs between the mobile station 11 and the base station controller 40 (more specifically, the SDU/RLP 41), resulting in a reduction in efficiency of the radio resources, and also resulting in propagation delay due to the retransmission. In particular, such problems become serious when traffics are unnecessarily transmitted to the base transceiver system in a handoff state of the mobile communication network.

SUMMARY OF THE INVENTION

It is, therefore, an object of the present invention to provide an apparatus and method for controlling packet data transmission between a base station controller and a base transceiver system in a mobile communication network.

It is another object of the present invention to provide an apparatus and method for removing overflow occurring in an internal buffer of a base transceiver system during packet data exchange between a base station controller and the base transceiver system in a mobile communication network.

It is further another object of the present invention to provide an apparatus and method for preventing a reduction in efficiency of radio resources due to retransmission of packet data from a base station controller to a base transceiver system in a mobile communication network.

It is yet another object of the present invention to provide an apparatus and method for removing propagation delay caused by retransmission of packet data during packet data exchange between a base station controller and a base transceiver system in a mobile communication network.

It is still another object of the present invention to provide an apparatus and method for accurately determining the number of data packets transmitted from a base station controller to a base transceiver system in a mobile communication network.

To achieve the above and other objects, the present invention provides an apparatus and method for controlling a BSC to transmit as much packet data as an amount that can be stored in a buffer of a BTS. The BTS with the buffer temporarily stores the packet data received from the BSC for transmission to a mobile station.

In accordance with a first aspect of the present invention, there is provided a method for controlling packet data transmission to a base transceiver system (BTS) in a base station controller (BSC) in a mobile communication network including the BSC receiving data packets, and the BTS with a buffer for storing data packets received from the BSC for transmission to a mobile station. The method comprises, upon receipt of data packets by the BSC, comparing a size of the buffer with a number of data packets that were transmitted from the BSC to the BTS but not yet transmitted from the BTS to the mobile station; and transmitting the received data packets to the BTS, if the size of the buffer is greater than the number of the untransmitted data packets.

In accordance with a second aspect of the present invention, there is provided a method for controlling packet data transmission between a base station controller (BSC) and a base transceiver system (BTS) in a mobile communication network including the BSC receiving data packets, and the BTS with a buffer for storing data packets received from the BSC for transmission to a mobile station. The method comprises reporting by the BTS to the BSC a number of data packets received from the BSC and then transmitted to the mobile station; calculating by the BSC a number of data packets that were transmitted from the BSC to the BTS but not yet transmitted from the BTS to the mobile station, based on the reported number of the data packets; upon receiving data packets, comparing by the BSC a size of the buffer with a number of untransmitted data packets; and transmitting the received data packets from the BSC to the BTS, if the size of the buffer is greater than the number of the untransmitted data packets.

In accordance with a third embodiment of the present invention, there is provided a method for calculating a number of data packets transmitted from a base station controller (BSC) to a base transceiver system (BTS) in a mobile communication network including the BSC receiving data packets, and the BTS with a buffer for storing data packets received from the BSC for transmission to a mobile station. The method comprises reporting by the BTS to the BSC a first number representing a number of data packets transmitted from the BTS to the mobile station and a second number representing a number of data packets stored in the buffer; if the first number and the second number are all zero (0), determining by the BSC whether a third number representing a number of data packets that were transmitted from the BSC to the BTS at a previous report time but not yet transmitted from the BTS to the mobile station is equal to a fourth number representing a number of data packets that were transmitted from the BSC to the BTS at a current report time but not yet transmitted from the BTS to the mobile station; and calculating the number of the data packets transmitted from the BSC to the BTS as zero, if the third number is equal to the fourth number.

BRIEF DESCRIPTION OF THE DRAWINGS

The above and other objects, features and advantages of the present invention will become more apparent from the following detailed description when taken in conjunction with the accompanying drawings in which:

FIG. 9 illustrates a user record in a base transceiver system according to an embodiment of the present invention;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, a packet data transmission operation according to an embodiment of the present invention is applied to the mobile communication network of FIG. 1. The embodiment of the present invention can be also applied to IS-95A/B, GSM (Global System for Mobile communication), IS-2000, WCDMA, UMTS, CDMA-2000 1xEV-DO, and GPRS networks. The packet data transmission operation according to the embodiment of the present invention is performed by a base station controller (specifically, SDU) and a base transceiver system in the mobile communication network.

Figure 1:
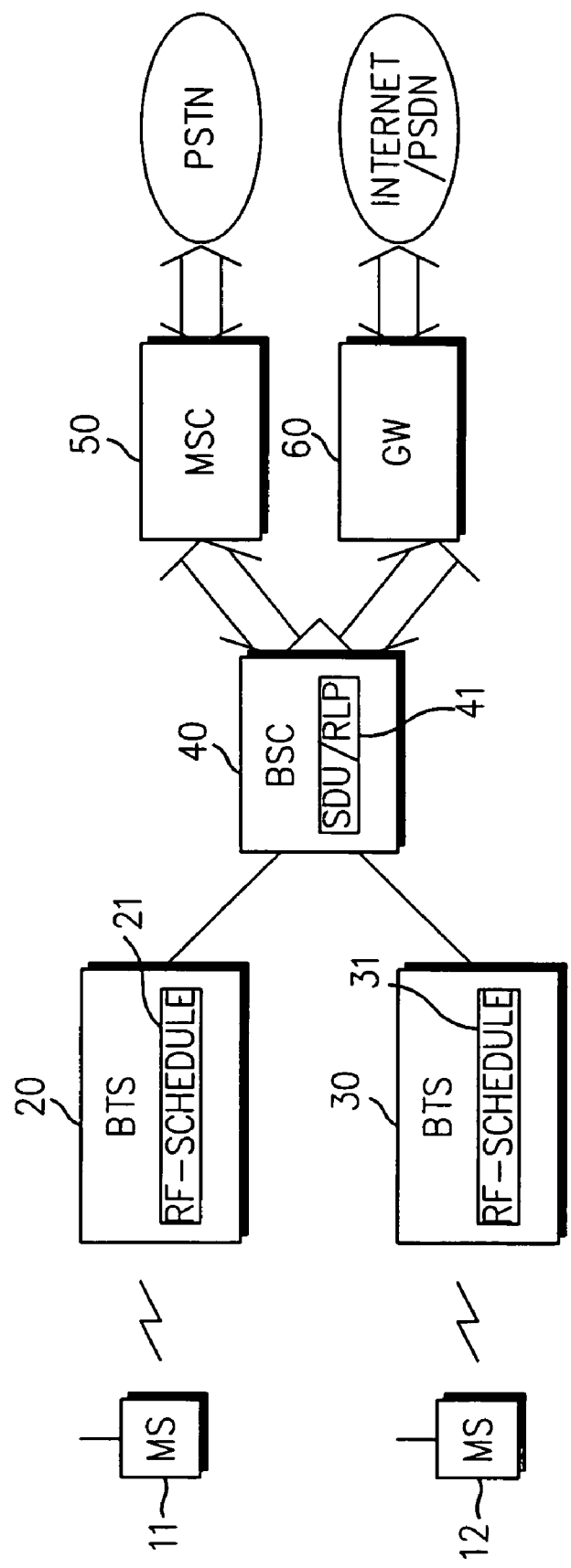
FIG. 1 illustrates a configuration of a general mobile communication network.
Figure 2:
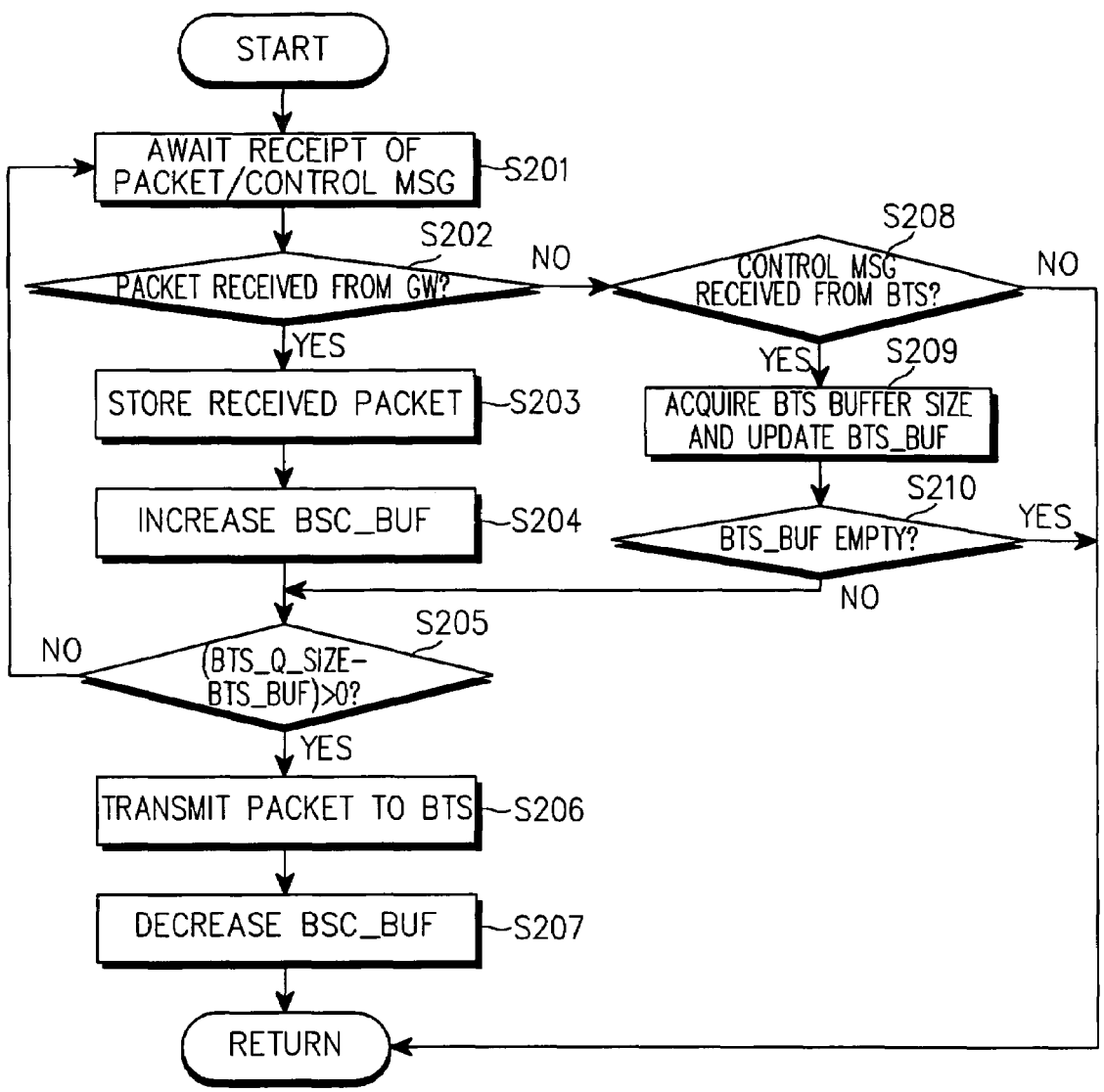
FIG. 2 illustrates a procedure for controlling packet data transmission by a base station controller according to the prior art.
Figure 3:
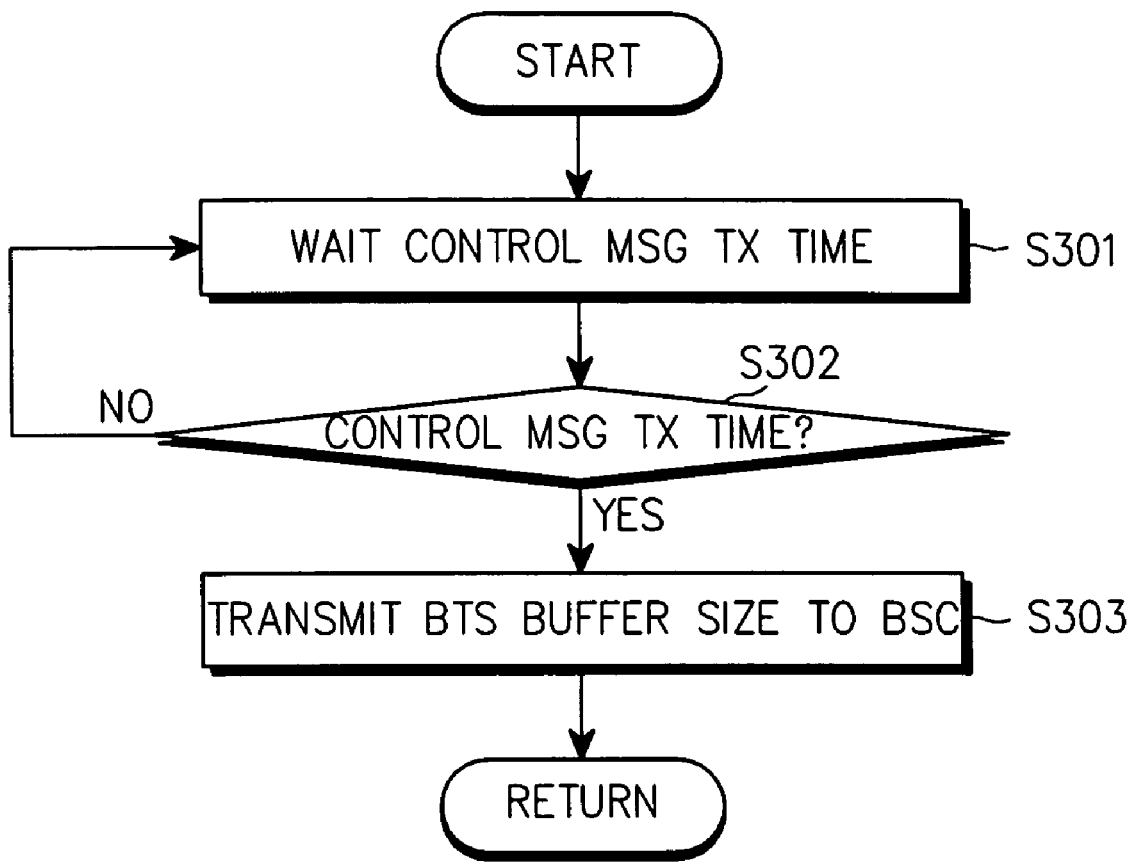
FIG. 3 illustrates a procedure for transmitting a control message with buffer size information by a base transceiver system according to the prior art.
Figure 4:
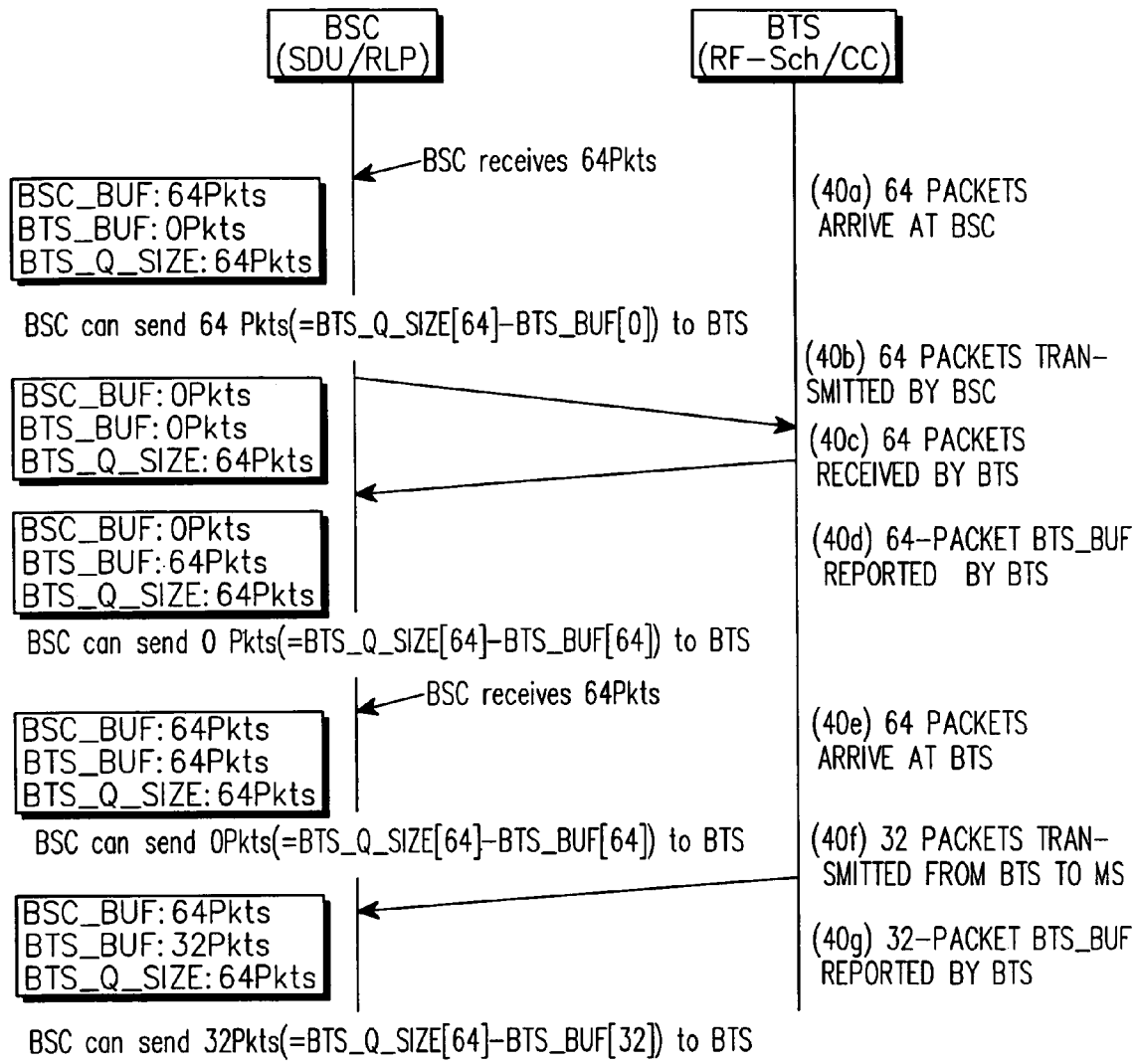
FIG. 4 illustrates a procedure for exchanging packet data between a base station controller and a base transceiver system according to the prior art.
Figure 5:
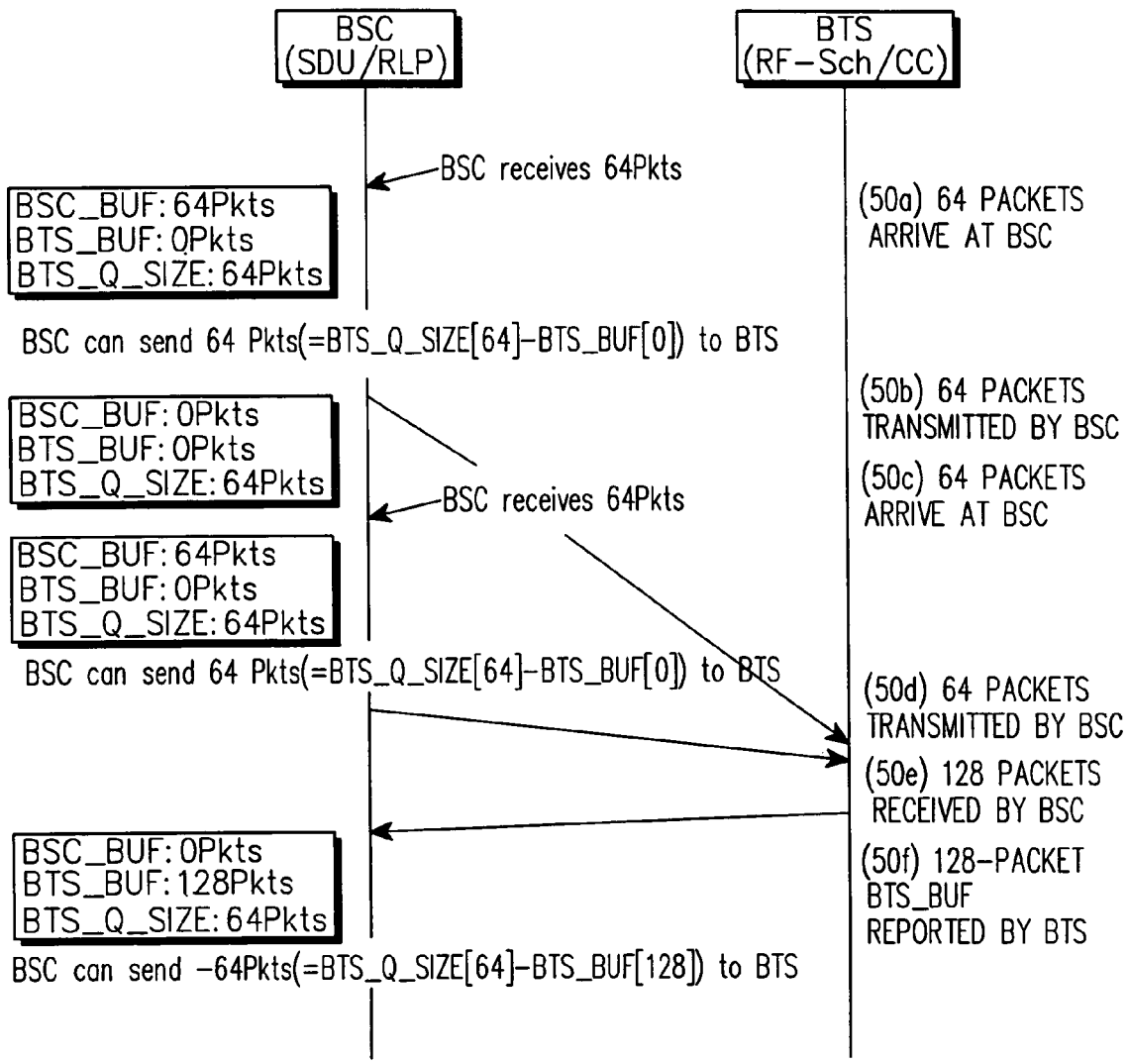
FIG. 5 illustrates a modified procedure for exchanging packet data between a base station controller and a base transceiver system according to the prior art.
Figure 6:
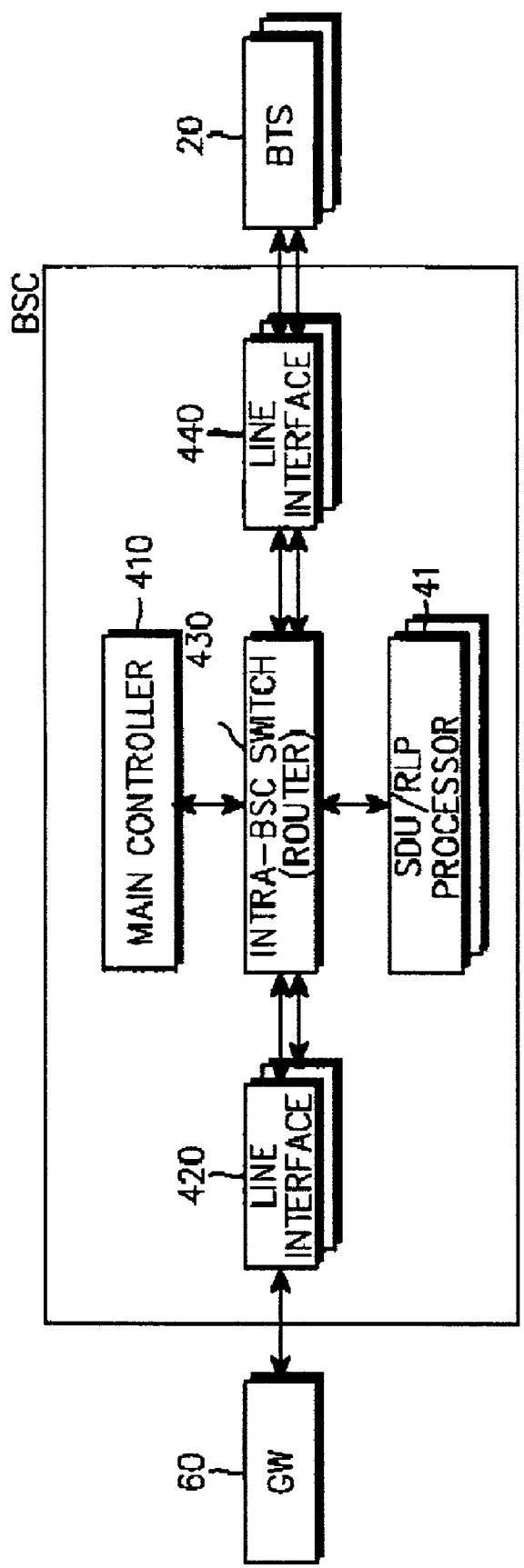
FIG. 6 illustrates a detailed structure of the base station controller shown in FIG. 1, to which the present invention is applied.

FIG. 6 illustrates a detailed structure of the base station controller shown in FIG. 1, to which the present invention is applied. Referring to FIG. 6, the base station controller 40 includes a main controller 410, a line interface 420, an intra-BSC switch (or router) 430, a line interface 440, and an SDU/RLP processor 41.

The main controller 410 controls the overall operation of the base station controller 40. The line interface 420 is provided for connection with the gateway 60, while the line interface 440 is provided for connection with the base transceiver system 20. The intra-BSC switch 430 routes traffic in the base station controller 40. The SDU (Selection & Distribution Unit) portion of processor 41 multiplexes/demultiplexes traffic transmitted/received over two or more links during a soft handoff. The RLP (Radio Link Protocol) portion of processor 41 supports error recovery of the radio links.

Although the packet data transmission control operation proposed by the invention can be realized through a separate physical device, it will be assumed herein that the packet data transmission control operation is realized by software in the SDU/RLP processor 41. The realization by software enables the use of the intact modules in the existing base station controller.

The SDU/RLP processor 41 manages a user record of FIG. 9 for the operation according to an embodiment of the present invention.

Referring to FIG. 9, a user record is comprised of User-ID, $NUM_{TX\_SDU2BTS}$, $NUM_{TX\_BTS2AIR}$, and $Q_{BTS\_Q\_PER\_USER}$. User-ID is a key of the record, for identifying the user. $NUM_{TX\_SDU2BTS}$ represents the number of packets that the base station controller 40 (specifically, the SDU 41) has transmitted to the base transceiver system 20, but the base transceiver system 20 has not yet transmitted in the air, that is, to the respective mobile station. $NUM_{TX\_BTS2AIR}$ represents the number of packets transmitted over the radio link from the base transceiver system 20 to the mobile station 11. $Q_{BTS\_Q\_PER\_USER}$ represents a limit of the buffer allocated to the corresponding user in the base transceiver system 20, i.e., a size of an internal buffer included for packet transmission to the mobile station 11. The $Q_{BTS\_Q\_PER\_USER}$ is a value previously recognized by the base station controller 40, while the $NUM_{TX\_BTS2AIR}$ is a value reported by the base transceiver system 20 at a preset control message transmission time.

Figure 7:
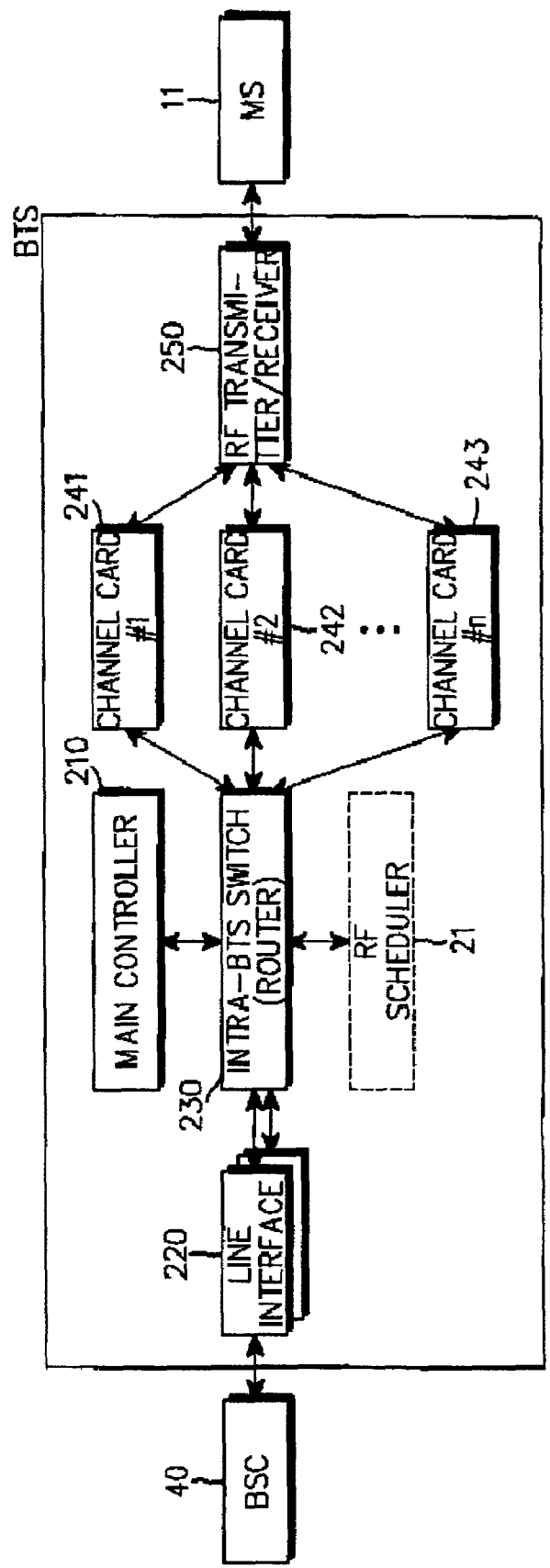
FIG. 7 illustrates a detailed structure of the base transceiver system shown in FIG. 1, to which the present invention is applied.

FIG. 7 illustrates a detailed structure of the base transceiver system shown in FIG. 1, to which the present invention is applied. Although the base transceiver system will be herein assumed to be the base transceiver system 20 of FIG. 1, the other base transceiver system 30 also has the same structure.

Referring to FIG. 7, the base transceiver system 20 includes a main controller 210, a line interface 220, an intra-BTS switch (or router) 230, channel cards 241 to 243, an RF transmitter/receiver 250, and an RF scheduler 21.

The main controller 210 controls the overall operation of the base transceiver system 20. The line interface 220 is provided for connection with the base station controller 40. The RF transmitter/receiver 250 is provided for exchanging data and control signals with the mobile station 11. The intra-BTS switch 230 determines a traffic route in the base transceiver system 20. The RF scheduler 21 supports efficient management of the radio resources. The RF scheduler 21 may either be an independent processor as illustrated or be realized by software in the channel cards 241 to 243.

The packet data transmission control operation proposed by the invention can be realized through a separate physical device, it will be assumed herein that the packet data transmission control operation is realized by software in the channel cards 241 to 243. The realization by software enables the use of the intact modules in the existing base transceiver system.

Figure 8:
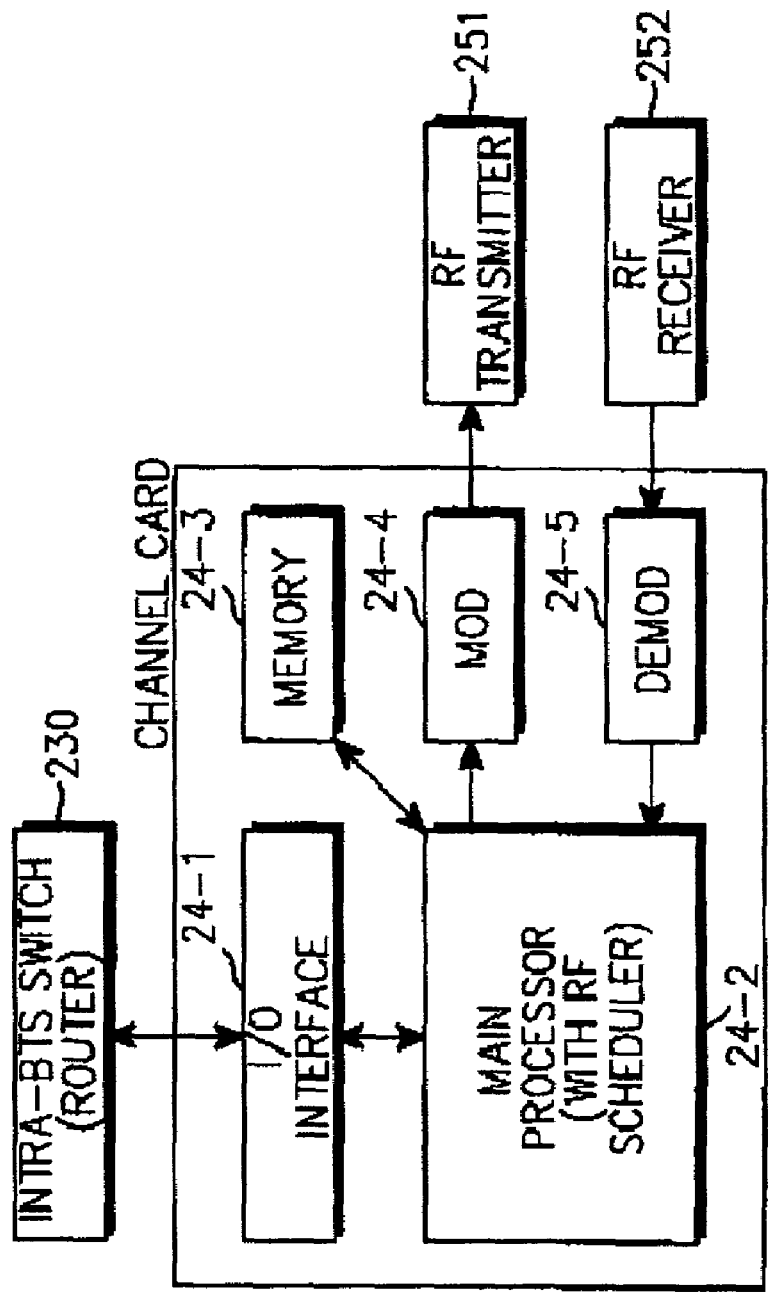
FIG. 8 illustrates a detailed structure of the channel card shown in FIG. 7.

FIG. 8 illustrates a detailed structure of the channel card shown in FIG. 7. Although the channel card will be herein assumed to be the channel card 241, the other channel cards 242 to 243 also have the same structure.

Referring to FIG. 8, the channel card 241 includes an input/output interface 24-1, a main processor 24-2, a memory 24-3, a modulator 24-4, and a demodulator 24-5.

The input/output interface 24-1 is provided for connection with the intra-BTS switch 230. The modulator 24-4 modulates data and control signals to be transmitted to mobile station 11 through the RF transmitter 251. The demodulator 24-5 demodulates data and control signals received from the mobile station 11 through the RF receiver 252. The memory 24-3 includes an internal buffer for receiving packet data to be transmitted to the mobile station 11 from the base station controller 40, and buffering (or temporarily storing) the received packet data. Further, the memory 24-3 can store various control information. The main processor 24-2 controls a packet data transmission operation according to an embodiment of the present invention. The main processor 24-2 may have a function of the RF scheduler 21 shown in FIG. 7.

Figure 10:
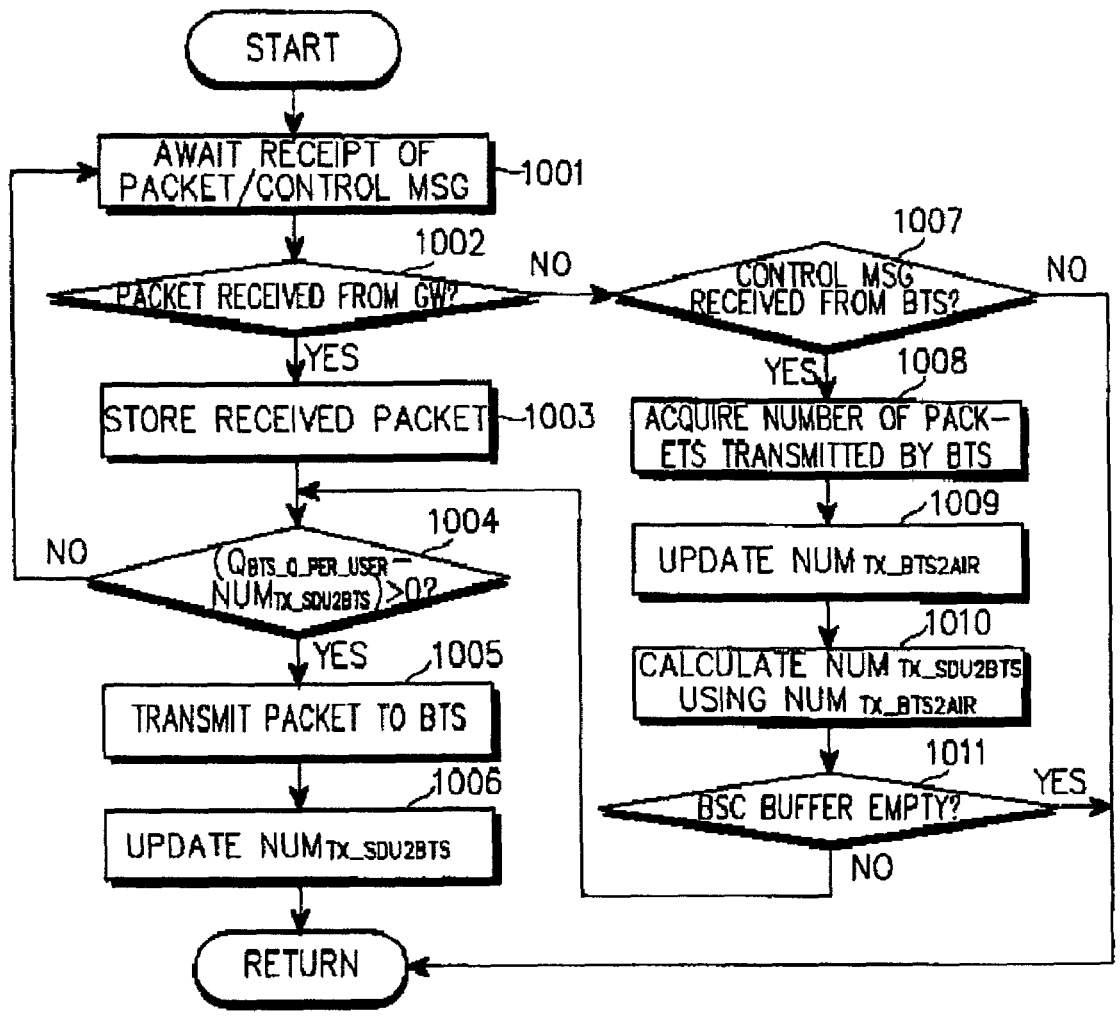
FIG. 10 illustrates a procedure for controlling packet data transmission by a base station controller according to an embodiment of the present invention.

FIG. 10 illustrates a procedure for controlling packet data transmission by a base station controller according to an embodiment of the present invention. Although this packet data transmission control procedure is performed in this embodiment by the SDU processor 41 of the base station controller (BSC) 40 shown in FIG. 6, it will be assumed that the procedure is performed by the BSC 40, for convenience of explanation.

Referring to FIG. 10, in step 1001, the BSC 40 awaits reception of packet data traffic from the gateway 60 or reception of a control message from the base transceiver system (BTS) 20. If it is determined in step 1002 that packet data traffic (hereinafter, called "packet" for short) is received from the gateway 60, the BSC 40 stores the received packet in its internal memory in step 1003. Next, in step 1004, the BSC 40 calculates the number of available packets that can be transmitted to the BTS 20, using a value of $Q_{BTS\_Q\_PER\_USER}$ and a value of $NUM_{TX\_SDU2BTS}$. If the value of $Q_{BTS\_Q\_PER\_USER}$ is greater than the value of $NUM_{TX\_SDU2BTS}$ in step 1004, the BSC 40 transmits as much packet as a difference $Q_{BTS\_Q\_PER\_USER} - NUM_{TX\_SDU2BTS}$ to the BTS 20 in step 1005. The value of $Q_{BTS\_Q\_PER\_USER}$ is a value indicating a size of an internal buffer of the BTS 20. The value of $NUM_{TX\_SDU2BTS}$ is a value representing the number of packets that the BSC 40 has transmitted to the BTS 20, but the BTS 20 has not yet transmitted in the air to the mobile station, and the value of $NUM_{TX\_SDU2BTS}$ is included in a control message reported (transmitted) from BTS 20. After transmitting the packet to the BTS 20, the BSC 40 increases the $NUM_{TX\_SDU2BTS}$ value by the packets transmitted to the BTS (step 1006). That is, $NUM_{TX\_SDU2BTS}$ represents the number of packets transmitted to the BTS 20 by the BSC 40.

If it is determined in step 1007 that a control message is received from the BTS 20, the BSC 40 acquires information, included in the received control message, on the number of packets transmitted by the BTS 20 to the mobile station 11 over a radio link in step 1008, and updates the $NUM_{TX\_BTS2AIR}$ to the acquired value in step 1009. Thereafter, in step 1010, the BSC 40 calculates $NUM_{TX\_SDU2BTS}$ using the updated $NUM_{TX\_BTS2AIR}$. The calculation is performed by updating $NUM_{TX\_SDU2BTS}$ to ($NUM_{TX\_SDU2BTS}$−$NUM_{TX\_BTS2AIR}$). That is, in step 1010, the BSC 40 calculates the number of packets currently stored to be transmitted to the BTS 20, by calculating the number of remaining packets transmitted to the BTS minus the packets transmitted to the mobile station 11 over the radio link among the packets transmitted to the BTS 20. After step 1010, the BSC 40 determines in step 1011 whether the internal buffer of the BSC 40 is empty. If the internal buffer of the BSC 40 is not empty, it means that there remain the packets to be transmitted to the BTS 20. In this case, the BSC 40 proceeds to step 1004 where it determines the number of available packets that can be transmitted to the BTS 20, and then, transmits as many packets as the number of available packets in step 1005. Since the $NUM_{TX\_BTS2AIR}$ value is a temporarily used value, it is possible to use one field value of the control message transmitted from the BTS 20 to the BSC 40 without definition on the variable $NUM_{TX\_BTS2AIR}$ in actual realization.

Figure 11:
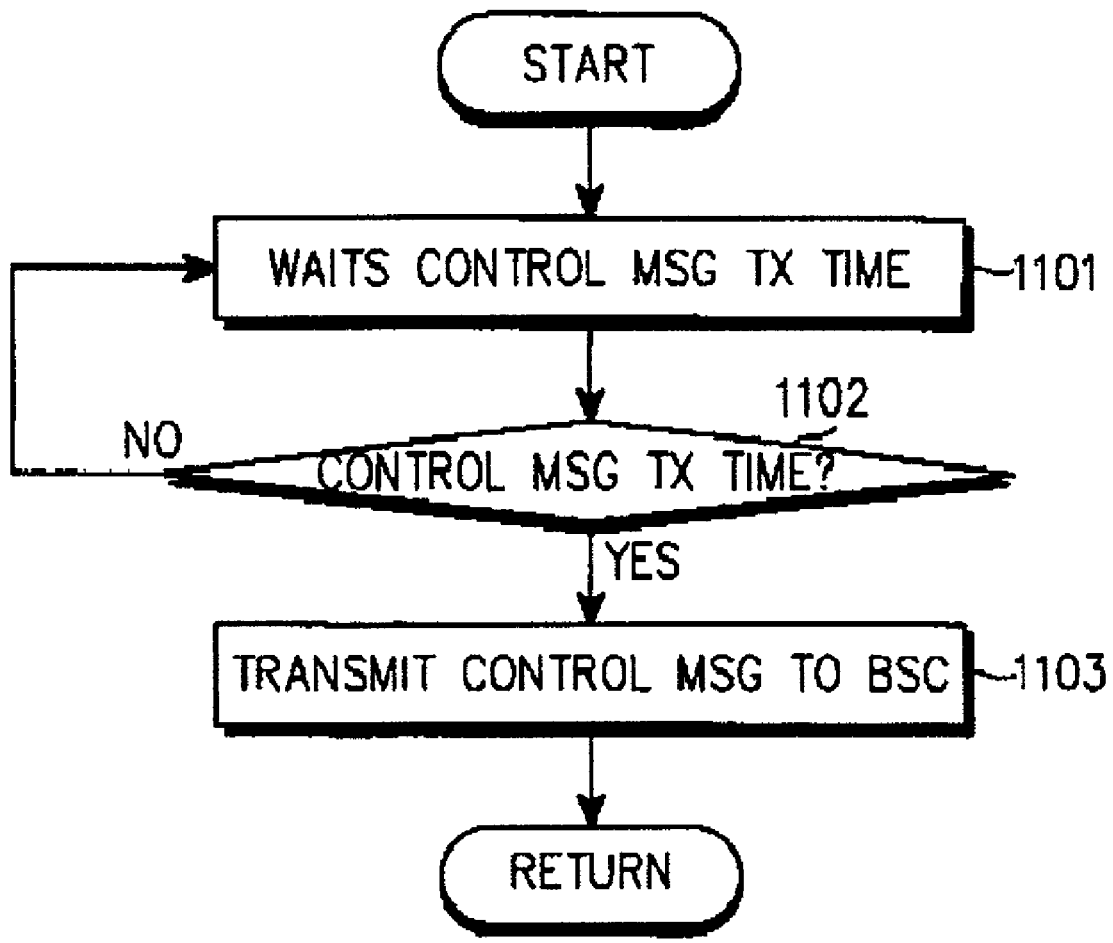
FIG. 11 illustrates a procedure for transmitting a control message including information on the number of transmitted packets by a base transceiver system (BTS) according to an embodiment of the present invention.

FIG. 11 illustrates a procedure for transmitting a control message including information on the number of transmitted packets by a base transceiver system (BTS) according to an embodiment of the present invention. Although the control message transmission procedure is performed by the main processor 24-2 in the channel card of the BTS 20 shown in FIGS. 7 and 8 in this embodiment, it will be assumed herein that the control message transmission procedure is performed by the BTS 20, for convenience of explanation.

Referring to FIG. 11, the BTS 20 waits a control message transmission time in step 1101. If it is determined in step 1102 that it is the control message transmission time, the BTS 20 transmits to the BSC 40 a control message including information on the number of packets transmitted to the mobile station 11 over the radio link in step 1103. Here, the "control message transmission time" can be set to either a preset period or a time at which the BTS 20 transmits the traffic over the radio link. When the control message is transmitted by periods, the BTS 20 reports the number of the packets transmitted over the radio link to the BSC 40 for a unit time period. However, when the control message is reported at the time when the traffic is transmitted over the radio link, the BTS 20 reports the number of the packets transmitted at the corresponding time to the BSC 40.

Figure 12:
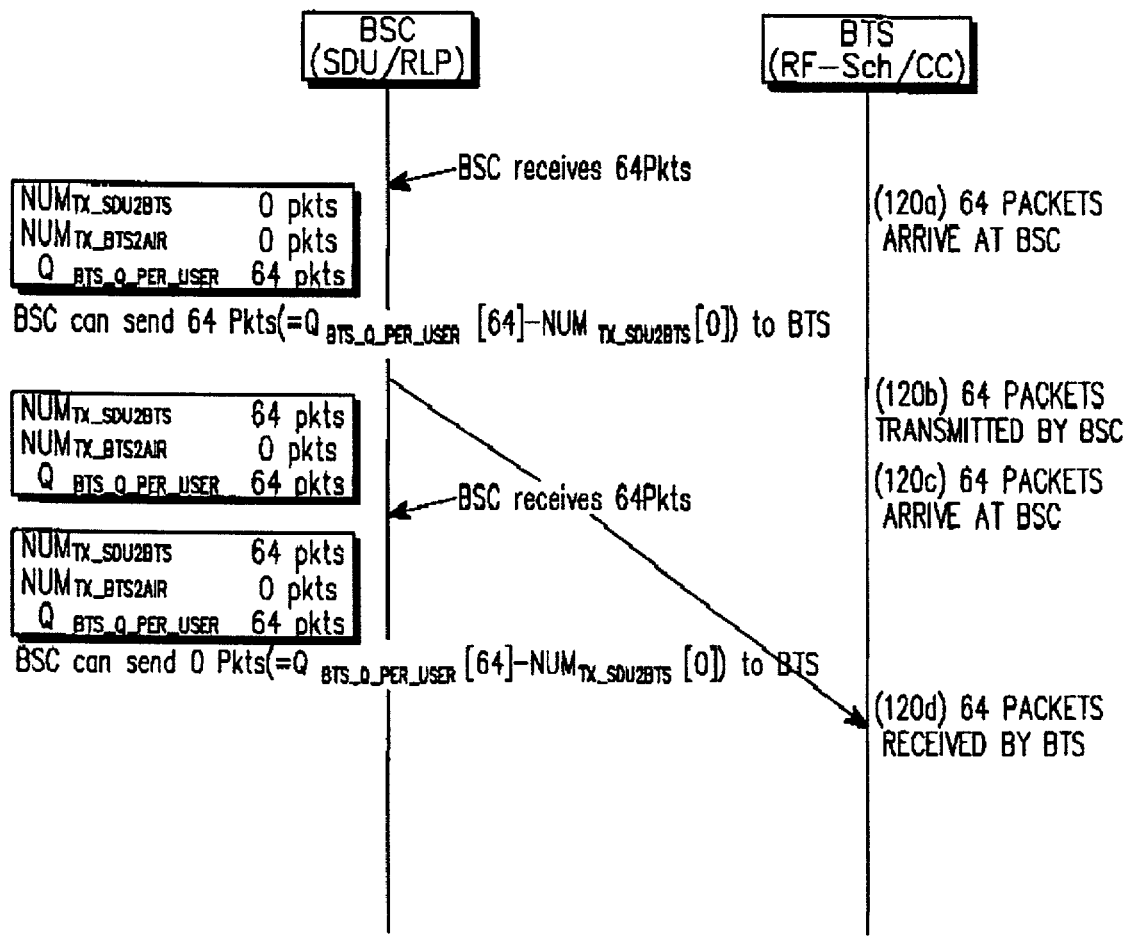
FIG. 12 illustrates a procedure for exchanging packet data between a base station controller (BSC) and a base transceiver system (BTS) according to an embodiment of the present invention.

FIG. 12 illustrates an exemplary procedure for exchanging packet data between a base station controller (BSC) and a base transceiver system (BTS) according to the above-described embodiment of the present invention. Here, it is assumed that a value of $Q_{BTS\_Q\_PER\_USER}$ indicating the size of the internal buffer in the BTS 20 is 64 packets, and no packet is initially transmitted from the BSC 40 to the BTS 20.

Referring to FIG. 12, if packet data traffic is received from the gateway 60 in step 120a, the BSC 40 calculates the number of packets transmissible to the BTS 20 (see step 1004 of FIG. 10). In this case, since no packet has been transmitted from the BSC 40 to the BTS 20, the BSC 40 determines that it can transmit 64 (=$Q_{BTS\_Q\_PER\_USER}$−$NUM_{TX\_SDU2BTS}$) packets to the BTS 20. Accordingly, in step 120b, the BSC 40 transmits 64 packets to the BTS 20 and updates $NUM_{TX\_SDU2BTS}$, indicating the number of packets transmitted from the BSC 40 to the BTS 20, to 64.

Now, it is assumed that 64 new packets arrive at the BSC 40 in step 120c before the 64 packets transmitted by the BSC 40 have not yet arrived at the BTS 20. In this case, since the 64 packets transmitted by the BSC 40 have not yet arrived at the BTS 20 or, though have arrived at the BTS 20, they have not been transmitted to the mobile station 11 over the radio link, the BSC 40 can recognize that it can transmit no more packet to the BTS 20. This is because $Q_{BTS\_Q\_PER\_USER}$−$NUM_{TX\_SDU2BTS}$=64−64=0. At this point, the BSC 40 stores the received 64 new packets in its internal buffer. In step 120d, the BTS 20 receives only the 64 packets transmitted in step 120b by the BSC 40. This is because though the 64 new packets were received in step 120c, the BSC 40 did not transmit the 64 new packets to the BTS 20. The 64 new packets are transmitted from the BSC 40 to the BTS 20 at the time when the BTS 20 transmits the received 64 packets to the mobile station 11 over the radio link and then reports the transmission result to the BSC 40.

Figure 13:
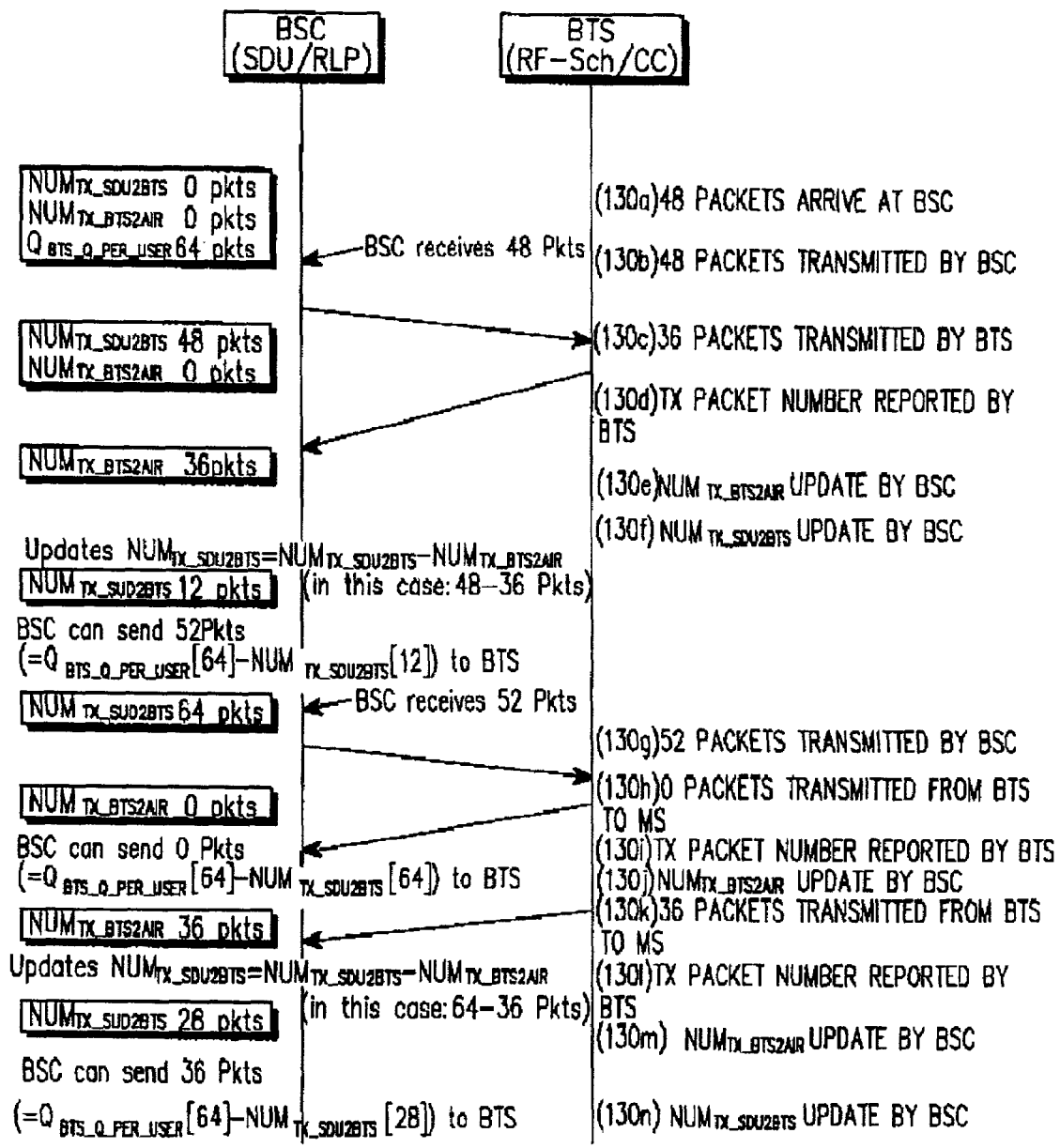
FIG. 13 illustrates a modified procedure for exchanging packet data between a base station controller (BSC) and a base transceiver system (BTS) according to an embodiment of the present invention.

FIG. 13 illustrates another exemplary procedure for exchanging packet data between a base station controller (BSC) and a base transceiver system (BTS) according to the above-described embodiment of the present invention. Here, it is assumed that a value of $Q_{BTS\_Q\_PER\_USER}$ indicating the size of the internal buffer in the BTS 20 is 64 packets, and no packet is initially transmitted from the BSC 40 to the BTS 20.

Referring to FIG. 13, 48 packets arrive at the BSC 40 in step 130a. Upon receipt of the 48 packets, the BSC 40 calculates the number of packets transmissible to the BTS 20 (see step 1004 of FIG. 10). At this point, since no packet has been transmitted from the BSC 40 to the BTS 20, the BSC 40 determines that it can transmit 64 (=$Q_{BTS\_Q\_PER\_USER}$−$NUM_{TX\_SDU2BTS}$) packets to the BTS 20. Accordingly, in step 130b, the BSC 40 transmits 48 packets to the BTS 20 and updates $NUM_{TX\_SDU2BTS}$, indicating the number of packets transmitted from the BSC 40 to the BTS 20, to 48.

Upon receipt of the 48 packets, the BTS 20 transmits 36 packets to the corresponding mobile station 11 over the radio link in step 130c, and transmits to the BSC 40 a control message including the number of packets transmitted over the radio link in step 130d, thereby to report the number of the transmitted packets.

Upon receipt of the report on the number of the transmitted packets, the BSC 40 updates a value of $NUM_{TX\_BTS2AIR}$ to 36 in step 130e, and updates a value of $NUM_{TX\_SDU2BTS}$ in step 130f. The updated $NUM_{TX\_SDU2BTS}$ value is calculated by subtracting the updated $NUM_{TX\_BTS2AIR}$ value from the previous $NUM_{TX\_SDU2BTS}$ value. That is, the updated $NUM_{TX\_SDU2BTS}$ value becomes 12, calculated by subtracting the updated $NUM_{TX\_BTS2AIR}$ value of 36 from the previous $NUM_{TX\_SDU2BTS}$ value of 48. The BSC 40 determines the number of packets transmissible to the BTS 20, using the updated $NUM_{TX\_SDU2BTS}$ value and the $Q_{BTS\_Q\_PER\_USER}$ value indicating the size of the internal buffer of the BTS 20. That is, the BSC 40 determines that it can transmit 52 (=$Q_{BTS\_Q\_PER\_USER}$−$NUM_{TX\_SDU2BTS}$=64−12) packets to the BTS 20. Now, it is assumed that 52 new packets are received from the gateway 60. Accordingly, in step 130g, the BSC 40 transmits 52 packets to the BTS 20 and updates $NUM_{TX\_SDU2BTS}$, indicating the number of packets transmitted from the BSC 40 to the BTS 20, to 64 (calculated by adding the number 52 of the currently transmitted packets to the number 12 of the previously transmitted packets).

The BTS 20 transmits no packet to the mobile station 11 over the radio link in step 130h, and transmits to the BSC 40 a control message including information on the number of the packets transmitted over the radio link in step 130*i*, thereby to report the number of the transmitted packets.

Upon receipt of the report on the number of the transmitted packets, the BSC 40 updates a value of $NUM_{TX\_BTS2AIR}$ to 0 in step 130*j*. At this point, it is not necessary to update a value of $NUM_{TX\_SDU2BTS}$, because the updated $NUM_{TX\_BTS2AIR}$ value is 0. The BSC 40 determines the number of packets transmissible to the BTS 20, using the previously updated $NUM_{TX\_SDU2BTS}$ value and the $Q_{BTS\_Q\_PER\_USER}$ value indicating the size of the internal buffer of the BTS 20. That is, the BSC 40 determines that it can transmit 0 ($=Q_{BTS\_Q\_PER\_USER}-NUM_{TX\_SDU2BTS}=64-64$) packet to the BTS 20.

Thereafter, the BTS 20 transmits 36 packets to the mobile station 11 over the radio link in step 130*k*, and transmits to the BSC 40 a control message including information on the number of the packets transmitted over the radio link in step 130*l*, thereby to report the number of the transmitted packets.

Upon receipt of the report on the number of the transmitted packets, the BSC 40 updates a value of $NUM_{TX\_BTS2AIR}$ to 36 in step 130*m*, and updates a value of $NUM_{TX\_SDU2BTS}$ in step 130*n*. The updated $NUM_{TX\_SDU2BTS}$ value is calculated by subtracting the updated $NUM_{TX\_BTS2AIR}$ value from the previous $NUM_{TX\_SDU2BTS}$ value. That is, the updated $NUM_{TX\_SDU2BTS}$ value becomes 28 calculated by subtracting the updated $NUM_{TX\_BTS2AIR}$ value of 36 from the previous $NUM_{TX\_SDU2BTS}$ value of 64. The BSC 40 determines the number of packets transmissible to the BTS 20, using the updated $NUM_{TX\_SDU2BTS}$ value and the $Q_{BTS\_Q\_PER\_USER}$ value indicating the size of the internal buffer of the BTS 20. That is, the BSC 40 determines that it can transmit 36 ($=Q_{BTS\_Q\_PER\_USER}-NUM_{TX\_SDU2BTS}=64-28$) packets to the BTS 20. Accordingly, the BSC 40 transmits 36 packets to the BTS 20.

Ideally, there is no loss in a link between the BSC 40 and the BTS 20. Actually, however, it is not possible to exclude a possibility that a loss will occur in the link. The case where a loss occurs in the link can be divided into two cases, each having the following problems.

First, when the packets transmitted by the BSC 40 fail to arrive at the BTS 20 due to a loss of the link between the BSC 40 and the BTS 20, the BSC 40 mis-recognizes that the lost packets are still buffered in the internal buffer of the BTS 20. For example, though the BSC 40 transmitted 64 packets to the BTS 20, one of the packets may be lost in the link between the BSC 40 and the BTS 20. In this case, the BSC 40 will set $NUM_{TX\_SDU2BTS}$ to 64. However, the BTS 20 has actually received only 63 packets, and thus, will report to the BSC 40 that it has transmitted 63 packets to the mobile station 11 after transmitting all of the 63 packets. Accordingly, $NUM_{TX\_SDU2BTS}$ is updated to 1 ($=64-63$). Although the BTS 20 has no more packets to transmit, the BSC 40 continuously maintains $NUM_{TX\_SDU2BTS}$ to 1, so the BSC 40 will misjudge that there is one packet to transmit through the BTS 20, resulting in a decrease in the number of available packets transmissible from the BSC 40 to the BTS 20.

Second, the control message reported to the BSC 40 by the BTS 20 may be lost during transmission. In this case, though the BTS 20 has already transmitted the control message, the BSC 40 does not receive a report indicating transmission of the control message. Thus, the BSC 40 may mis-recognize that the packets to be transmitted are stored in the internal buffer of the BTS 20.

Further, the present invention provides a solution to the problems caused by the loss occurring in the link between the BSC 40 and the BTS 20. To solve the problems, the BTS 20 and the SDU 41 in the BSC 40 perform the following function.

The BTS 20 reports to the BSC 40 not only the number of the packets transmitted to the mobile station 11 over the radio link, but also the number of the packets buffered in the buffer of the BTS 20. As mentioned before, these reports are made by periods through the control message or made at the time when the BTS 20 transmits the packets to the mobile station 11.

The SDU 41 of the BSC 40 manages variables of OLD-$NUM_{TX\_SDU2BTS}$, NUMreset, and MAXreset in addition to the above-mentioned variables of $Q_{BTS\_Q\_PER\_USER}$, $NUM_{TX\_SDU2BTS}$, and $NUM_{TX\_BTS2AIR}$. Here, an OLD-$NUM_{TX\_SDU2BTS}$ value represents a $NUM_{TX\_SDU2BTS}$ value at the time when a previous report is received from the BTS 20. The other variables NUMreset and MAXreset will be described later.

Figure 14:
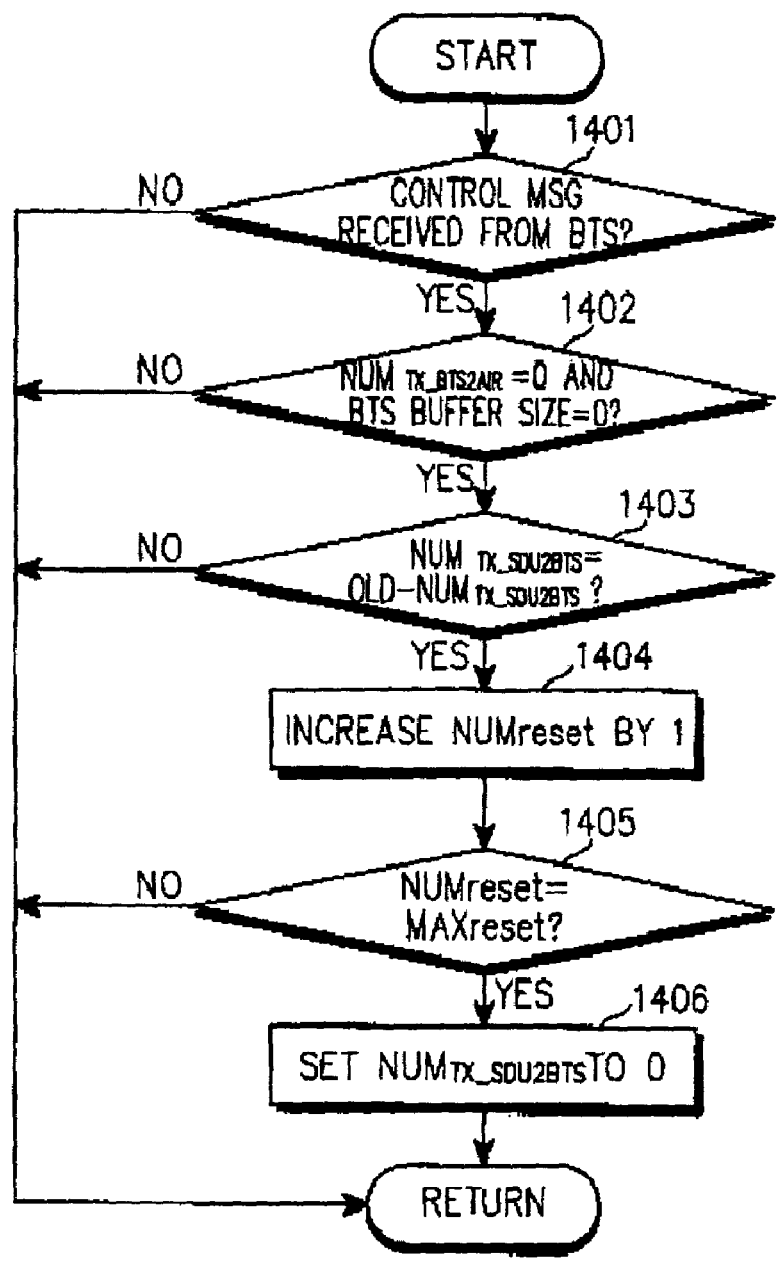
FIG. 14 illustrates a procedure for controlling packet data transmission by a base station controller (BSC) according to another embodiment of the present invention.

FIG. 14 illustrates a procedure for controlling packet data transmission by a base station controller (BSC) according to another embodiment of the present invention. This procedure accurately determines the number of data packets transmitted from the BSC 40 to the BTS 20.

Referring to FIG. 14, if it is determined in step 1401 that the a control message is received from the BTS 20, the BSC 40 analyzes fields of the received control message in step 1402. As the result of analysis, if the number of packets transmitted to the mobile station 11 over the radio link by the BTS 20 is 0 and the buffer size of the BTS 20 is also 0, the BSC 40 determines in step 1403 whether a $NUM_{TX\_SDU2BTS}$ value at the current report time is identical to an OLD-$NUM_{TX\_SDU2BTS}$ value at the previous report time. If they are identical to each other, the BSC 40 increases NUMreset by 1 in step 1404, and determines in step 1405 whether the NUMreset value is identical to a MAXreset value. If the NUMreset value is identical to the MAXreset value, i.e., if the NUMreset value is identical to a predetermined value, the BSC 40 sets the $NUM_{TX\_SDU2BTS}$ value to 0 in step 1406. However, if the NUMreset value is not identical to the MAXreset value, the BSC 40 returns to step 1401. The MAXreset value can be set to a proper value by an operator of the mobile communication network.

In the procedure of FIG. 14, if a buffer state of the BTS 20 analyzed by the BSC 40 (that is, $NUM_{TX\_SDU2BTS}$) is not identical to an internal state value reported by the BTS 20 for a period where there is no user packet generated and the BTS 20 also has no packet to transmit, the corresponding state value of the BSC 40 (that is, $NUM_{TX\_SDU2BTS}$) is initialized to 0. By doing so, the procedure of FIG. 10 according to the present invention can be correctly performed even though a link loss occurs between the BSC 40 and the BTS 20.

Figure 15:
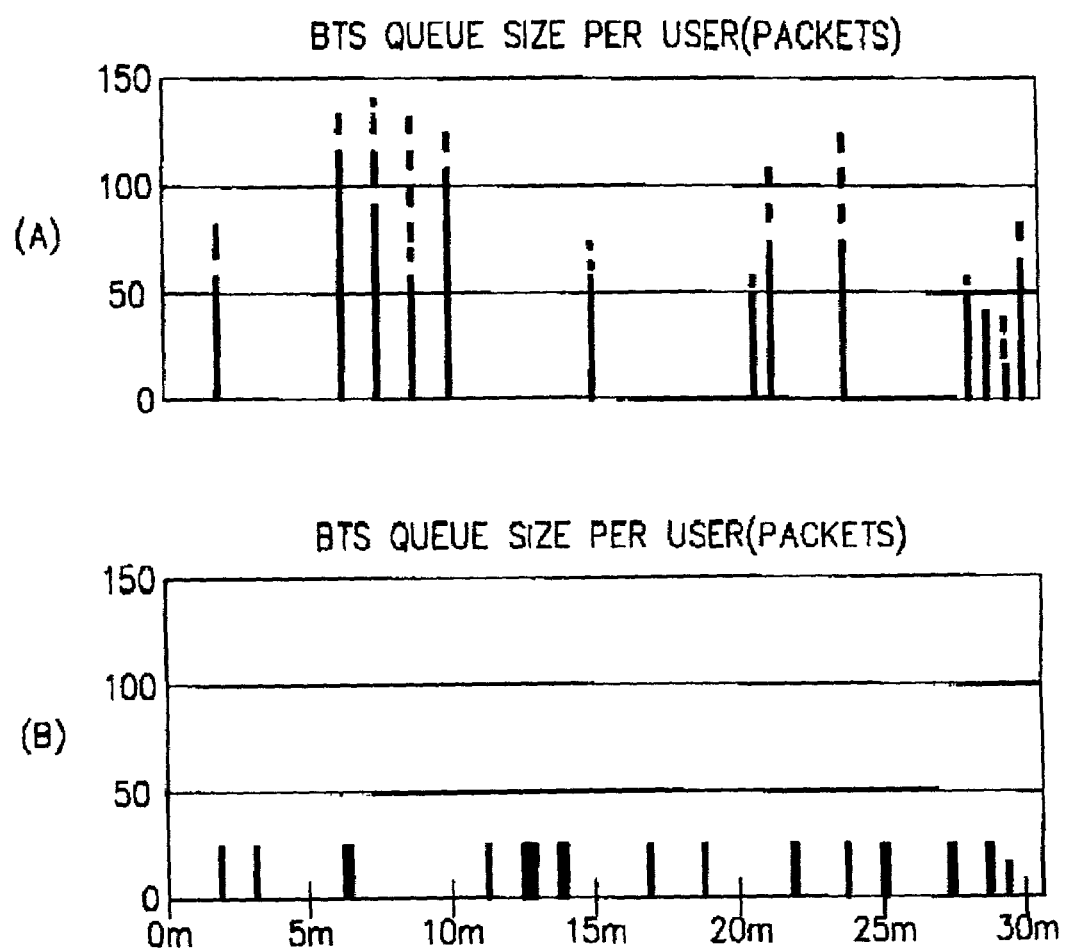
FIGS. 15A and 15B illustrate BTS buffer sizes applied to the packet data transmission procedures according to the prior art and according to an embodiment of the present invention, respectively.

FIGS. 15A and 15B illustrate simulation results for analyzing performance of the BTS buffer size in the packet data transmission procedure according to the prior art and according to an embodiment of the present invention, respectively. The simulations were performed on the assumption that 200 ms time delay occurs during packet transmission between BSC and BTS, and a limit (maximum size) of the buffer for storing user packets is 30 packets. A pattern of the assumed packet data traffic is one WWW (World Wide Web) user.

FIG. 15A illustrates a BTS buffer size in the packet data transmission procedure according to the prior art, and FIG. 15B illustrates a BTS buffer size in the packet data transmission procedure according to an embodiment of the present invention. In the drawings, the x-axis represents a simulation time and the y-axis represents a BTS buffer size.

Referring to FIG. 15A, though the maximum limit is set to 30 packets, a maximum of about 140 packets are provided to the BTS. Therefore, a maximum of 110 packets may be discarded due to overflow of the BTS buffer.

Referring to FIG. 15B, however, the number of packets provided to the BTS never exceeds 30, the maximum limit. That is, the BTS buffer does not undergo overflow.

As described above, the BSC according to an embodiment of the present invention can transmit as much traffic as an amount, which is not exactly coincident with the buffer size of the BTS. Therefore, it is possible to prevent overflow of the BTS buffer, resulting in a decrease in retransmissions between the BSC and the BTS. The decrease in retransmission contributes to an increase in efficiency of the radio resources. In particular, it is possible to prevent a decrease in link efficiency between the BSC and the BTS, caused by unnecessary traffic transmission to the BTS in a handoff state in the mobile communication network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling packet data transmission to a base transceiver system (BTS) in a base station controller (BSC) in a mobile communication network including the BSC receiving data packets, and the BTS having a buffer for storing data packets received from the BSC for transmission to a mobile station, the method comprising the steps of:
   upon receipt of data packets, comparing a size of the buffer in the BTS with a number of untransmitted data packets reported by the BTS, the untransmitted data packets being those that were transmitted from the BSC to the BTS but not yet transmitted from the BTS to the mobile station; and
   transmitting the received data packets to the BTS, if the size of the buffer in the BTS is greater than the number of the untransmitted data packets,
   wherein the number of the untransmitted data packets is calculated by subtracting a number of transmitted first data packets, the transmitted first data packets being those that were transmitted from the BTS to the mobile station, reported by the BTS at stated periods, from a number of transmitted second data packets, the transmitted second data packets being those that were transmitted from the BSC to the BTS.

2. A method for controlling packet data transmission to a base transceiver system (BTS) in a base station controller (BSC) in a mobile communication network including the BSC receiving data packets, and the BTS having a buffer for storing data packets received from the BSC for transmission to a mobile station, the method comprising the steps of:
   upon receipt of data packets, comparing a size of the buffer in the BTS with a number of untransmitted data packets reported by the BTS, the untransmitted data packets being those that were transmitted from the BSC to the BTS but not yet transmitted from the BTS to the mobile station; and
   transmitting the received data rackets to the BTS, if the size of the buffer in the BTS is greater than the number of the untransmitted data packets,
   wherein the number of the untransmitted data packets is calculated by subtracting a number of transmitted first data packets, the transmitted first data packets being those that were transmitted from the BTS to the mobile station, reported by the BTS when the BTS transmits data packets to the mobile station, from a number of transmitted second data packets, the transmitted second data packets being those that were transmitted from the BSC to the BTS.

3. An apparatus for controlling packet data transmission in a mobile communication network that comprises a base transceiver system (BTS) with a buffer for storing data packets to be transmitted to a mobile station, the apparatus comprising:
   a line interface for receiving data packets from a public serving data network (PSDN); and
   a base station controller (BSC) for, upon receiving data packets from the PSDN, comparing a size of the buffer in the BTS with a number of untransmitted data packets reported by the BTS, the untransmitted data packets being those that were transmitted from the BSC to the BTS but not yet transmitted from the BTS to the mobile station, and transmitting the received data packets to the BTS, if the size of the buffer is greater than the number of the untransmitted data packets,
   wherein the BSC calculates the number of the untransmitted data packets by subtracting a number of transmitted first data packets, the transmitted first data packets being those that were transmitted from the BTS to the mobile station, reported by the BTS at stated periods, from a number of transmitted second data packets, the transmitted second data packets being those that were transmitted from the BSC to the BTS.

4. An apparatus for controlling packet data transmission in a mobile communication network that comprises a base transceiver system (BTS) with a buffer for storing data packets to be transmitted to a mobile station, the apparatus comprising:
   a line interface for receiving data packets from a public serving data network (PSDN); and
   a base station controller (BSC) for, upon receiving data packets from the PSDN, comparing a size of the buffer in the BTS with a number of untransmitted data packets reported by the BTS, the untransmitted data packets being those that were transmitted from the BSC to the BTS but not yet transmitted from the BTS to the mobile station, and transmitting the received data packets to the BTS, if the size of the buffer is greater than the number of the untransmitted data packets,
   wherein the BSC calculates the number of the untransmitted data packets by subtracting a number of transmitted first data packets, the transmitted first data packets being those that were transmitted from the BTS to the mobile station, reported by the BTS after transmitting the data packets to the mobile station, from a number of transmitted second data packets, the transmitted second data packets being those that were transmitted from the BSC to the BTS.

5. A method for controlling packet data transmission between a base station controller (BSC) and a base transceiver system (BTS) in a mobile communication network including the BSC receiving data packets, and the BTS with a buffer for storing data packets received from the BSC for transmission to a mobile station, the method comprising the steps of:
   reporting by the BTS to the BSC a number of data packets received from the BSC and then transmitted to the mobile station;
   calculating by the BSC a number of untransmitted data packets, the untransmitted data packets being those that were transmitted from the BSC to the BTS and reported by the BTS but not yet transmitted from the BTS to the mobile station, based on the reported number of the data packets received from the BSC and then transmitted to the mobile station;

upon receiving data packets, comparing by the BSC a size of the buffer with the number of untransmitted data packets; and transmitting the received data packets from the BSC to the BTS, if the size of the buffer is greater than the number of the untransmitted data packets.

6. The method as claimed in claim 5, wherein the number of the transmitted data packets is reported to the BSC by the BTS at stated periods.

7. The method as claimed in claim 5, wherein the number of the transmitted data packets is reported to the BSC by the BTS when the BTS transmits packet data to the mobile station.

8. The method as claimed in claim 5, wherein the number of the received data packets transmitted to the BTS is equal to a difference between the size of the buffer and the number of the untransmitted data packets.

9. An apparatus for controlling packet data transmission in a mobile communication network comprising a base transceiver system (BTS) with a buffer for storing data packets to be transmitted to a mobile station, the apparatus comprising:

a line interface for receiving data rackets from an upper layer; and a base station controller (BSC) for calculating a number of untransmitted data packets, the untransmitted data packets being those that were transmitted from the BSC to the BTS and reported by the BTS but not yet transmitted from the BTS to the mobile station, the calculation based on a number of data packets transmitted to the mobile station as reported by the BTS; and upon receiving data packets, transmitting the received data packets to the BTS, if the size of the buffer in the BTS is greater than the number of the untransmitted data packets.

10. The apparatus as claimed in claim 9, wherein the BSC calculates the number of the untransmitted data packets by subtracting a number of transmitted first data packets, the transmitted first data packets being those that were transmitted from the BTS to the mobile station, reported by the BTS at stated periods, from a number of transmitted second data packets, the transmitted second data packets being those that were transmitted from the BSC to the BTS.

11. The apparatus as claimed in claim 9, wherein the BSC calculates the number of the untransmitted data packets by subtracting a number of transmitted first data packets, the transmitted first data packets being those that were transmitted from the BTS to the mobile station, reported by the BTS after transmitting the data packets to the mobile station, from a number of transmitted second data packets, the transmitted second data packets being those that were transmitted from the BSC to the BTS.

12. The apparatus as claimed in claim 9, wherein the number of the received data packets transmitted to the BTS is equal to a difference between the size of the buffer and the number of the untransmitted data packets.

13. A method for calculating a number of data packets transmitted from a base station controller (BSC) to a base transceiver system (BTS) in a mobile communication network including the BSC receiving data packets, and the BTS with a buffer for storing data packets received from the BSC for transmission to a mobile station, comprising the steps of:

reporting by the BTS to the BSC a first number representing a number of data packets transmitted from the BTS to the mobile station and a second number representing a number of data packets stored in the buffer;

if the first number and the second number are all zero (0), determining by the BSC whether a third number representing a number of data packets that were transmitted from the BSC to the BTS at a previous report time but not yet transmitted from the BTS to the mobile station is equal to a fourth number representing a number of data packets that were transmitted from the BSC to the BTS at a current report time but not yet transmitted from the BTS to the mobile station; and setting the number of the data packets transmitted from the BSC to the BTS as zero, if the third number is equal to the fourth number.

14. The method as claimed in claim 13, wherein the number of the data packets transmitted from the BSC to the BTS is set as zero, if the third number and the fourth number are equal to each other as many times as a preset number.

* * * * *